US007917852B2

(12) United States Patent
Wattenberg et al.

(10) Patent No.: US 7,917,852 B2
(45) Date of Patent: Mar. 29, 2011

(54) SYSTEM AND METHOD FOR VISUALLY ANALYZING GEOGRAPHIC DATA

(75) Inventors: Martin M. Wattenberg, Winchester, MA (US); Jesse H. Kriss, Cambridge, MA (US); Fernanda B. Viégas, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/427,907

(22) Filed: Jun. 30, 2006

(65) Prior Publication Data

US 2008/0005674 A1     Jan. 3, 2008

(51) Int. Cl.
*G06F 3/00* (2006.01)
*G06F 17/30* (2006.01)
*G06F 3/048* (2006.01)

(52) U.S. Cl. ............... 715/730; 715/835; 707/104.1; 707/737; 707/738; 707/999

(58) Field of Classification Search .................. 715/810, 715/835, 855; 707/104.1, 738, 999
See application file for complete search history.

(56) References Cited

U.S. PATENT DOCUMENTS

| 5,515,488 | A | 5/1996 | Hoppe et al. |
| 6,026,409 | A | 2/2000 | Blumenthal |
| 6,535,888 | B1 | 3/2003 | Vijayan et al. |
| 6,677,981 | B1 * | 1/2004 | Mancuso et al. ............ 348/36 |
| 7,043,501 | B2 * | 5/2006 | Schiller ............ 707/104.1 |
| 2004/0177009 | A1 | 9/2004 | Schrenk |
| 2004/0243533 | A1 | 12/2004 | Dempster et al. |

OTHER PUBLICATIONS

Tim Ormsby, Eileen Napoleon, Robert Burke, Carolyn Groess, and Laura Feaster. Getting To Know ArcGIS Desktop Second Edition. Copyright 2004. ESRI Press, Redlands CA. ISBN 1-58948-083-X. pp. 1, 2, 11, 12, 55, 57, 121, 123, 124, 132, 134, 135, 136, 147, 160, 162, 164, 432 , and the back cover.*
Tim Ormsby, Eileen Napolean, Robert Burke, Carolyn Groess, and Laura Feaster. Getting To Know ArcGIS Desktop Second Edition. Copyright 2004. ESRI Press, Redlands CA. ISBN 1-58948-083-X. pp. 1, 2, 11, 12, 55, 57, 121, 123, 124, 132, 134, 135, 136, 147, 160, 162, 164, 432, and the back cover.*
Arikawa, M., "A framework for using ad hoc queries to geographic databases as visual components of interactive maps," Proceedings of DEXA '92 International conference on Database and Expert Systems Applications, Sep. 1992, Valencia, Spain, pp. 320-325.
Ribarsky, W. et al., "Building the Visual Earth," Proceedings of the International Society for Optical Engineering Conference, vol. 4744, pp. 228-239.

* cited by examiner

*Primary Examiner* — Boris Pesin
*Assistant Examiner* — Elizabeth G Wright
(74) *Attorney, Agent, or Firm* — Douglas A. Lashmit; Hoffman Warnick LLC

(57) ABSTRACT

A system and method for analyzing, searching and viewing demographic data within different geographic regions. A system is provided that includes: a mapping system for displaying a map having a plurality of geographic regions, wherein each geographic region is selectable; a demographic system for displaying demographic statistics for a selected geographic region; a matching system for calculating and displaying a set of similar geographic regions that have demographic statistics that most closely match the selected geographic region; and an adjustment system that allows a user to adjust a target value for the demographic statistics being display, wherein an adjustment to the target causes the matching system to recalculate the set of similar geographic regions.

18 Claims, 3 Drawing Sheets

SYSTEM AND METHOD FOR VISUALLY ANALYZING GEOGRAPHIC DATA

FIELD OF THE INVENTION

The invention relates generally to analyzing geographic data, and more particularly to a system and method for visually analyzing, searching and viewing demographic data as a function of geographic region.

BACKGROUND OF THE INVENTION

There are numerous applications that can benefit from analyzing demographic data as a function of geography. For instance, a company selling goods in a particular geographic region may be interested in locating other geographic regions having similar demographic make-ups. There are currently many databases that include such information. For instance, census databases are available that provide various demographic values broken down by geographic region (e.g., zip codes).

Unfortunately, such databases can be difficult to navigate since they often have many data dimensions beyond the geographic component. Most software programs for exploring such data rely on the user entering explicit queries, that is, searching the database according to an explicitly specified set of criteria (e.g., find me all zip codes having a median household income in range x-y, in which the median age is above z, the female population is above n %, etc.). Constructing explicit queries can be difficult and time-consuming, particularly where the user may "tweak" different demographic values to "zero in" on relevant information (e.g., now find me some similar zip codes in which the medium age is a little lower and the property taxes are a little higher). In such cases, the user essentially has to start all over, and construct and perform an entirely new query.

Moreover, such solutions do not provide a simple approach for locating geographic regions that are demographically "similar" overall. For instance, a typical database may have 10-20 different data dimensions representing different demographic categories. While putting together a query to find regions that share a few similar demographics would be relatively straight forward, crafting explicit queries that take into account all of the available data dimension to locate demographically similar regions would be extremely complex and time consuming.

Accordingly, a need exists for a system that can allow a user to analyze demographic data among different geographic regions in a flexible and interactive manner.

SUMMARY OF THE INVENTION

The present invention addresses the above-mentioned problems, as well as others, by providing a system and method for searching, viewing and visually analyzing demographic data among different geographic regions with an easy to use interactive interface.

In a first aspect, the invention provides a geographic data visualization system, comprising: a mapping system for displaying a map having a plurality of geographic regions, wherein each geographic region is selectable; a demographic system for displaying demographic statistics for a selected geographic region; a matching system for calculating and displaying a set of similar geographic regions that have demographic statistics that most closely match the selected geographic region; and an adjustment system that allows a user to adjust a target value for the demographic statistics being display, wherein an adjustment to the target causes the matching system to recalculate the set of similar geographic regions.

In a second aspect, the invention provides a computer program product stored on a computer usable medium for analyzing geographic data, comprising: program code configured for allowing a geographic region to be selected from a plurality of geographic regions; program code configured for displaying demographic statistics for a selected geographic region; program code configured for calculating and displaying a set of similar geographic regions that have demographic statistics that most closely match the selected geographic region; and program code configured for allowing a user to adjust the demographic statistics being display, wherein an adjustment to a demographic statistic causes the set of similar geographic regions to be recalculated.

In a third aspect, the invention provides method of analyzing geographic data within a computerized interface, comprising: selecting a geographic region from a plurality of geographic regions; displaying demographic statistics for the selected geographic region within a set of interactive displays; calculating and displaying a set of similar geographic regions that have demographic statistics that most closely match the selected geographic region; adjusting a demographic statistic within one of the interactive displays; and recalculating the set of similar geographic regions.

In a fourth aspect, the invention provides a method for deploying geographic data visualization application, comprising: providing a computer infrastructure being operable to: allow a user to select a geographic region from a plurality of geographic regions; display demographic statistics for the selected geographic region within a set of interactive displays; calculate and display a set of similar geographic regions that have demographic statistics that most closely match the selected geographic region; allow the user to adjust a demographic statistic within one of the interactive displays; and recalculate the set of similar geographic regions based on an adjustment to one of the interactive displays.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
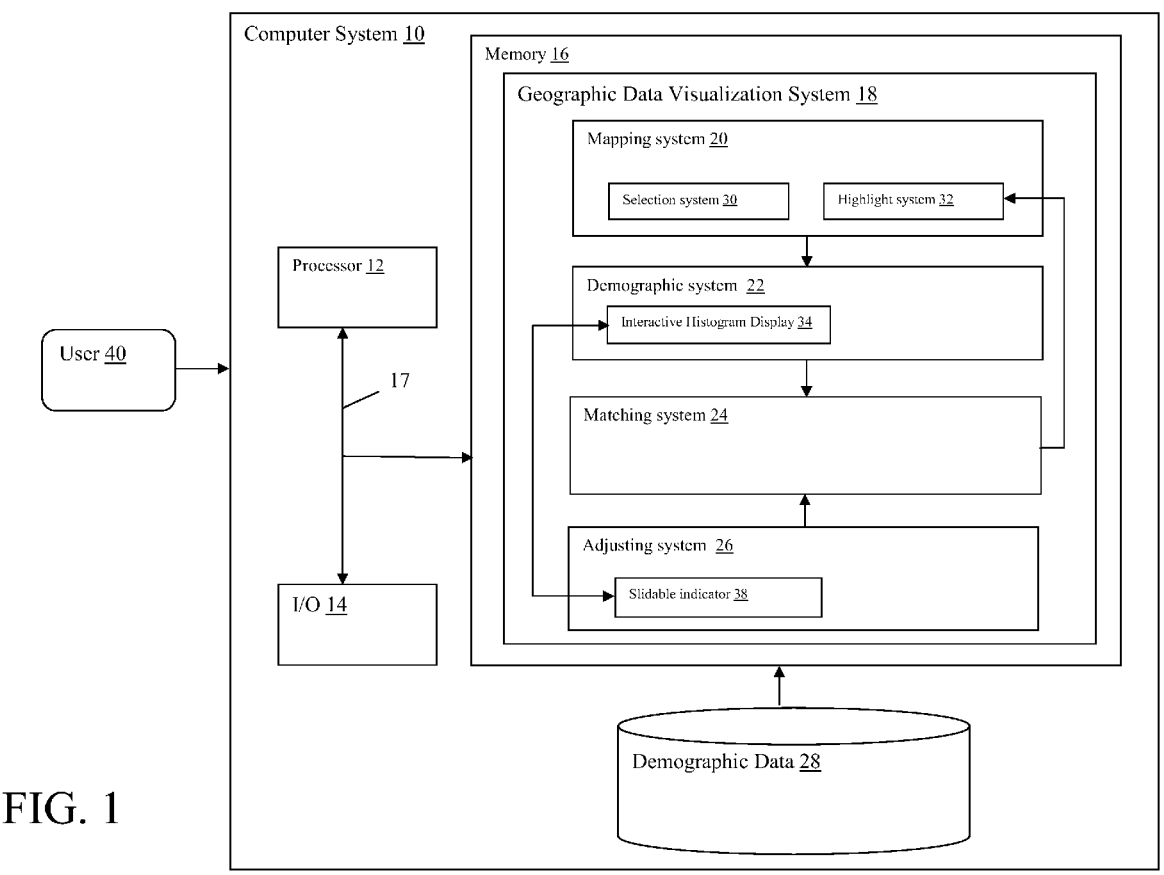
FIG. 1 depicts a computer system having a geographic data visualization system in accordance with an embodiment of the present invention.
Figure 2:
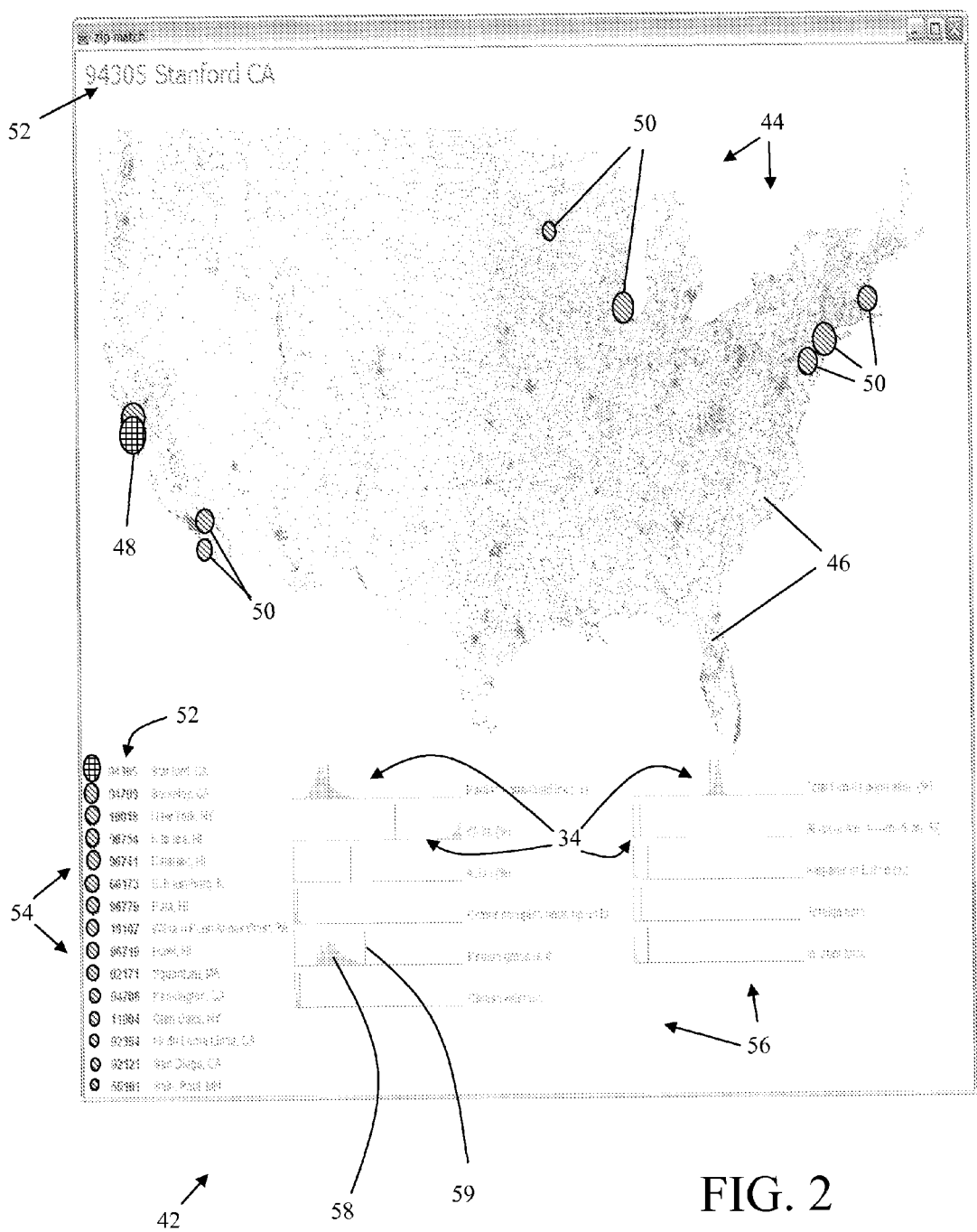
FIG. 2 depicts an interface generated by the geographic data visualization system of FIG. 1 in accordance with an embodiment of the present invention.

Referring now to drawings, FIG. 1 depicts a computer system 10 having a geographic data visualization system 18 that allows a user 40 to search, view and analyze demographic data 28 among different geographic regions within an easy to use interactive interface. It is understood that such an interface could be rendered directly by computer system 10, or be rendered in combination with a client system, such as a browser, that communicates with computer system 10 via a network. FIG. 2, discussed below, depicts an example of an interface 42 in which different geographic regions are broken down by zip code. Note that for the purposes of this invention, the term "geographic region" can be defined in any manner, e.g., as a zip code, a city, town, state, political districts, etc.

Geographic data visualization system 18 includes: a mapping system 20 for displaying a map having a plurality of selectable geographic regions; a demographic system 22 for generating and displaying a set of demographic statistics (derived from a database of demographic data 28) for a selected geographic region; a matching system 24 for identifying and displaying a set of statistically similar regions to the selected region; and an adjusting system 26 that allows the user to adjust one or more of the displayed demographic statistics.

In addition to displaying a map, mapping system 20 may include: a selection system 30 for allowing a user to select a geographic region; and a highlight system 32 that automatically highlights both the selected geographic region and a set of similar geographic regions. Any methodology may be employed by selection system 30 for allowing a selection, e.g., the user could enter data, such as zip code, into a dialog window, the user could "click" on one of the statistically similar regions displayed by the matching system 24, the user could "click" directly on selectable region on the map, etc. Moreover, any methodology may be used to highlight regions on the map. For instance, the highlighted regions may be highlighted with a shape and/or color/filler. To distinguish between the selected geographic regions and the set of similar geographic regions, different shapes, colors, or filler could be used to distinguish among them. In an illustrative embodiment described below, ovals are used and the size of the oval is dependent upon how demographically "close" the region is to the selected geographic region.

As noted, demographic system 24 displays demographic statistics for a selected region. Any number or type of demographic statistics can be shown. Typical demographic statistics for a geographic region might include income statistics, population make-up, housing information, scholastic data, tax information, etc. In one illustrative embodiment, the demographic statistics are rendered as a set of interactive histogram displays 34, an example of which is shown in FIG. 2 (e.g., see histogram 58). In such an embodiment, rather than simply displaying a fixed value for each demographic, interactive histogram display 34 displays: (1) a histogram of statistical data points that provide aggregate values for a given demographic across all of the geographic regions; and (2) a target value of where the selected geographic region falls within the histogram.

Figure 3A:
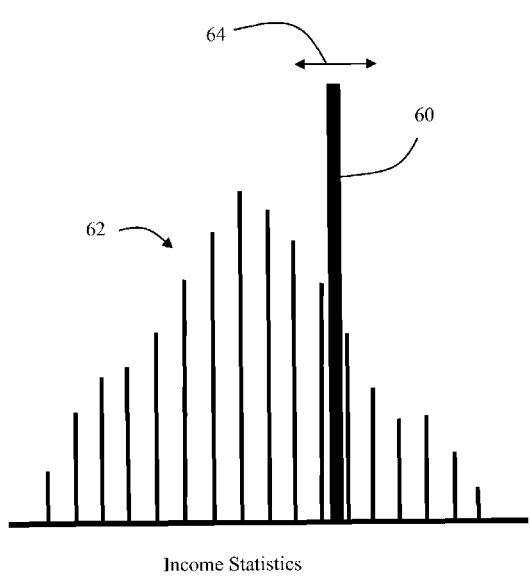
FIGS. 3A and 3B depict an example of an interactive histogram display in accordance with an embodiment of the present invention.
Figure 3B:
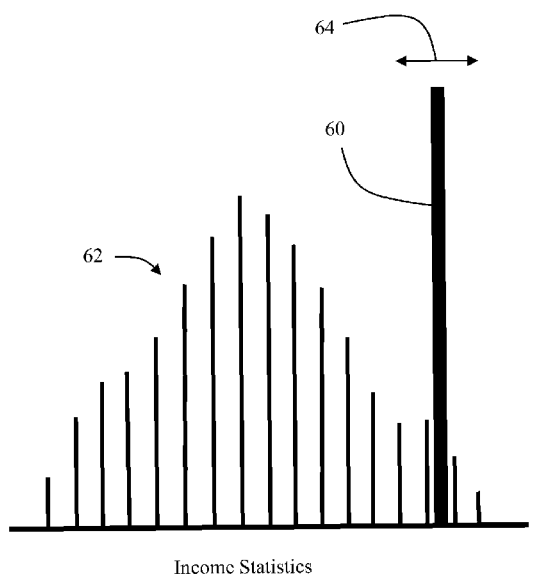

FIGS. 3A and 3B show an example of an interactive histogram display 62 for income statistics. In this case, the histogram shown in FIGS. 3A and 3B depicts a range of income level (along the x axis) and the aggregate number of geographic regions that fall into each level (along the y axis). Thus, as can be seen, most geographic regions fall in the center of the histogram, while some (towards the right) have higher incomes levels and others (towards the left) have lower income levels. In addition, a slidable indicator 60 is set to a target value that indicates where the selected geographic region falls within the histogram (FIG. 3A). Thus, as can be seen, in this example the selected geographic region has a somewhat higher income than the median geographic region. In addition, as described below, the indicator 60 can be manually adjusted to a new target value (FIG. 3B) by sliding it according to arrow 64. This allows the user to search for different geographic regions based on user adjustable demographic profiles.

Referring back again to FIG. 1, once a region is selected, matching system 24 is utilized to automatically identify a set of similar geographic regions, i.e., regions which have the closest/most similar demographic statistics to the selected geographic region. Any methodology for identifying such a set may be utilized. For example, in an embodiment in which demographic data 28 is stored as a set of multidimensional data, matching system 24 would analyze the data in each of the dimensions to determine which geographic regions had the most similar data values. In one illustrative embodiment, this could be done by calculating a sum of the absolute differences between data values in the selected region with data values in other regions for each of the different dimensions. Those regions having the lowest sums would be considered the closest regions. Such an approach could utilize a normalized Euclidean metric or Mahalanobis metric on the various data dimensions to determine closeness. In an alternative approach, clustering, e.g., using fuzzy logic, could be employed by matching system 24 to find the closest regions to a selected region. As noted, once the set of similar geographic regions are identified, they can be displayed, e.g., as a list, and highlighted in the map.

Adjusting system 26 allows the user to manually change one or more of the displayed demographic statistic target values, which will in turn cause the matching system 24 to recalculate the set of similar geographic regions. This feature thus allows the user to perform searches such as "find regions like Boston, but with lower rents," or "find regions like zip code 12345, but with lower housing costs and higher wages," etc.

In one illustrative embodiment this is accomplished using the interactive histogram displays 34 provided by demographic system 22. For instance, as described above, FIG. 3A depicts an interactive histogram display 62 that includes a slidable indicator 60 showing where the selected region falls for the income demographic. Slidable indicator 60 can be moved as shown in FIG. 3B (e.g., with a mouse operation) to adjust the target value for the income demographic, in this case to a higher income level. This will in turn cause matching system 24 to automatically recalculate the set of similar geographic regions to a new set that takes into account a higher income. Note that while adjusting system 26 is described herein using slidable indicators 38 within the context of interactive histogram displays 34, it should be understood that any system for adjusting displayed demographic data could be employed.

Referring now to FIG. 2, an example of an interface 42 is shown that includes a map 44, a set of demographic statistics 56 for a selected geographic region, and a list of similar geographic regions 54. In this case, the geographic regions comprise zip codes displayed as dots 46 on the map 44, and the selected zip code 52 is displayed in the top left corner (e.g., zip code "94305," which is in Stanford Calif.). The selected zip code 52 is also shown highlighted on the map 44 as a large oval 48 having cross-hatched filler. As noted above, any methodology may be used to select a zip code on map 44.

Demographic statistics 56 for zip code 94305 is shown as a set of interactive histogram displays 34, each having a slidable indicator set to a target value for the selected zip code. For example, the demographic "Median gross rent" includes a histogram 58, and a slidable indicator 59, which in this example shows that rents in zip code 94305 are very high relative to the rest of the zip codes shown on map 44.

The set of similar zip codes 54, which are calculated by matching system 24 (FIG. 1), is listed below the selected zip code 52 (i.e., 93405) in the bottom left corner of interface 42 by zip code and name. As can be seen, each similar zip code in the list 54 is shown with an oval having a size relative to its statistical "closeness" to the selected zip code. The ovals 50 for each of the similar zip codes are also highlighted on the map 44 to show where the similar zip codes are located. In this example, zip code 94709 (Berkeley, Calif.) is statistically the most similar zip code, while 55101 (Saint Paul, Minn.) is the 14$^{th}$ most similar zip code.

From interface 42, the user can perform any number of interactions to view, search, and analyze demographic data 28. For instance, the user could simply select an entirely new zip code, e.g., by clicking on one of the dots on map 44, selecting one of the similar zip codes shown in list 54, or entering a new zip code via a dialog (not shown). Any time a new zip code is selected: (1) the selected zip code is displayed at the top of the list 54; (2) a new set of similar zip codes are calculated by matching system 24 and displayed below the selected zip code 52; (3) the relevant demographic data for the selected zip code 52 are displayed as demographic statistics 56; (4) the selected zip code 52 is highlighted on the map 44; and (5) the new set of similar zip codes are also highlighted on the map 44.

Alternatively, the user could manually adjust one or more of the slidable indicators associated with the interactive histogram displays 34. When the user performs such an action, a new set of zip codes that most closely match the target values set by the user is recalculated, with the closest being placed at the top of the list 54, and the rest being placed in descending order of closeness in the list 54. Thus for example, the user may be interested in finding zip codes similar to 94305, but with a lower median gross rent. To locate such zip codes, the user would select 94305 (as shown) and then simply move the slidable indicator 59 for the median gross rent demographic to the left. Matching system 24 would calculate a new set of the zip codes that most closely match 94305, but with a lower median gross rent. The newly calculated zip codes would then replace the current data displayed in the list 54 and on the map 44. Accordingly, by adjusting one or more of the slidable indicators, the user is able to scan the database of demographic data 28 to find zip codes that most closely match the target values set by the user. This thus allows the user to quickly and efficiently identify geographic regions that have similar demographics, without constructing time consuming explicit queries.

In general, computer system 10 shown in FIG. 1 may comprise, e.g., a desktop, a laptop, a workstation, etc., and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a geographic data visualization system 18 could be created, maintained and/or deployed by a service provider that offers the functions described herein for customers. That is, a service provider could offer to provide an interface 42 to allow users to analyze demographic data by geographic region as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embodied in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A geographic data visualization system, comprising:
a computer device including:

a mapping system for displaying a map having a plurality of geographic regions, wherein each geographic region is selectable and a selected geographic region is highlighted on the map;

a demographic system for displaying demographic statistics for the selected geographic region;

a matching system for automatically calculating and displaying a set of similar geographic regions once the selected geographic region is selected by automatically calculating a sum of absolute differences between data values in the selected geographic region with data values in other geographic regions for each of the demographic statistics, wherein the set of similar geographic regions is highlighted differently from the selected geographic region on the map, each similar geographic region highlighted with a shape having a size, wherein the size of each shape is related to a value of an absolute difference indicating a demographic similarity between a corresponding similar geographic region and the selected geographic region; and an adjustment system that allows a user to adjust the target value for the demographic statistics being displayed, wherein an adjustment to the target value causes the matching system to automatically recalculate and redisplay the set of similar geographic regions that have demographic statistics that most closely match the adjusted target value for the demographic statistics for the selected geographic region.

2. The geographic data visualization system of claim 1, wherein each geographic region comprises a zip code.

3. The geographic data visualization system of claim 1, wherein the demographic statistics are rendered as interactive histogram displays.

4. The geographic data visualization system of claim 3, wherein each interactive histogram display includes a sliding indicator that allows the user to adjust the target value.

5. The geographic data visualization system of claim 1, wherein the demographic statistics are derived from a database having multidimensional demographic data broken down by region.

6. The geographic data visualization system of claim 1, wherein the matching system calculates the set of similar geographic regions using a metric selected from the group consisting of: an Euclidean metric and a Mahalanobis metric.

7. A computer program product stored on a computer usable medium for analyzing geographic data, comprising:

program code configured for allowing a geographic region to be selected from a plurality of geographic regions and a selected region is highlighted on a map;

program code configured for displaying demographic statistics for the selected geographic region;

program code configured for automatically calculating and displaying a set of similar geographic regions once the selected geographic region is selected by automatically calculating a sum of absolute differences between data values in the selected geographic region with data values in other geographic regions for each of the demographic statistics, wherein the set of similar geographic regions have demographic statistics that most closely match a target value for the demographic statistics for the selected geographic region, and wherein the set of similar geographic regions is highlighted differently from the selected geographic region on the map, each similar geographic region highlighted with a shape having a size, wherein the size of each shape is related to a value of an absolute difference indicating a demographic similarity between a corresponding similar geographic region and the selected geographic region; and program code configured for allowing a user to adjust the target value for the demographic statistics being displayed, wherein an adjustment to the target value for the demographic statistic causes the set of similar geographic regions to be automatically recalculated and redisplayed that have demographic statistics that most closely match the adjusted target value for the demographic statistics for the selected geographic region.

8. The computer program product of claim 5, wherein each geographic region comprises a zip code.

9. The computer program product of claim 5, wherein the demographic statistics are rendered as interactive histogram displays having associated target values for the selected geographic region.

10. The computer program product of claim 7, wherein each interactive histogram display includes a sliding indicator that allows the user to adjust a target value.

11. The computer program product of claim 5, wherein the demographic statistics are derived from a database having multidimensional demographic data broken down by region.

12. The computer program product of claim 5, wherein the set of similar geographic regions are calculated using a metric selected from the group consisting of: an Euclidean metric and a Mahalanobis metric.

13. A method of analyzing geographic data within a computerized interface, comprising:

providing a computer infrastructure being operable for:

selecting a geographic region from a plurality of geographic regions and a selected geographic region is highlighted on a map;

displaying demographic statistics for the selected geographic region within a set of interactive displays;

automatically calculating and displaying a set of similar geographic regions once the selected geographic region is selected by automatically calculating a sum of absolute differences between data values in the selected geographic region with data values in other geographic regions for each of the demographic statistics, wherein the set of similar geographic regions have demographic statistics that most closely match a target value for the demographic statistics for the selected geographic region, and wherein the set of similar geographic regions is highlighted differently from the selected geographic region on the map, each similar geographic region highlighted with a shape having a size, wherein the size of each shape is related to a value of an absolute difference indicating a demographic similarity between a corresponding similar geographic region and the selected geographic region;

adjusting the target value for the demographic statistics within one of the interactive displays;

automatically recalculating and redisplaying the set of similar geographic regions that have demographic statistics that most closely match the adjusted target value for the demographic statistics for the selected geographic region.

14. The method of claim 9, wherein each geographic region comprises a zip code.

15. The method of claim 9, wherein the interactive displays comprise interactive histogram displays, and wherein each interactive histogram display includes a sliding indicator that allows the user to adjust a target value associated with a demographic statistic.

16. The method of claim 9, wherein the demographic statistics are derived from a database having multidimensional demographic data broken down by region.

17. The method of claim 9, wherein the set of similar geographic regions are calculated using a metric selected from the group consisting of: an Euclidean metric and a Mahalanobis metric.

18. A method for deploying a geographic data visualization application comprising:

providing a computer infrastructure being operable to:

allow a user to select a geographic region from a plurality of geographic regions and highlight the selected geographic region on a map;

display demographic statistics for the selected geographic region within a set of interactive displays;

automatically calculate and display a set of similar geographic regions once the selected geographic region is selected by automatically calculating a sum of absolute differences between data values in the selected geographic region with data values in other geographic regions for each of the demographic statistics, wherein the set of similar geographic regions have demographic statistics that most closely match a target value for the demographic statistics for the selected geographic region, and wherein the set of similar geographic regions is highlighted differently from the selected geographic region on the map, each similar geographic region highlighted with a shape having a size, wherein the size of each shape is related to a value of an absolute difference indicating a demographic similarity between a corresponding similar geographic region and the selected geographic region;

allow the user to adjust the target value for the demographic statistic within one of the interactive displays;

automatically recalculate and redisplay the set of similar geographic regions that have demographic statistics that most closely match the demographic statistics for the selected geographic region based on the adjustment to the target value for the demographic statistic within one of the interactive displays.

* * * * *